United States Patent [19]

Marom

[11] Patent Number: 4,605,086
[45] Date of Patent: Aug. 12, 1986

[54] LIFTING AND MANEUVERING DEVICE FOR MOTOR VEHICLES

[76] Inventor: Itshak Marom, 21 Horev Street, Haifa, Israel

[21] Appl. No.: 664,900

[22] Filed: Oct. 26, 1984

[30] Foreign Application Priority Data

Nov. 3, 1983 [IL] Israel .................................. 70130

[51] Int. Cl.⁴ .............................................. B60S 9/215
[52] U.S. Cl. .................................... 180/202; 254/420; 280/767
[58] Field of Search ....................... 180/199, 200, 202; 280/767, 761, 43.23; 254/224, 420, DIG. 2; 310/80, 83

[56] References Cited

U.S. PATENT DOCUMENTS

| | | | |
|---|---|---|---|
| 1,340,024 | 5/1920 | Davis | 180/202 |
| 2,162,257 | 6/1939 | Hoecker | 180/202 |
| 2,330,894 | 10/1943 | Jezlen | 180/200 |
| 3,458,173 | 7/1969 | Kornovich | 254/420 |
| 3,826,322 | 7/1974 | Williams | 180/202 |
| 4,496,865 | 1/1985 | Allen et al. | 310/80 |

Primary Examiner—John J. Love
Assistant Examiner—Mark C. Dukes
Attorney, Agent, or Firm—Welsh & Katz, Ltd.

[57] ABSTRACT

A lifting and maneuvering device for motor vehicles is disclosed, including an auxiliary wheel assembly mounted adjacent to the front and/or the rear wheels of the vehicle. Vertical drive means raise and lower the auxiliary wheel assembly from retracted position to an operative extended position in which the front and/or rear wheels are lifted off the vehicle supporting surface. The orientation of the auxiliary wheel assembly is adjustable to permit driving of the wheel assembly in a manner which will rotate the vehicle.

20 Claims, 11 Drawing Figures

LIFTING AND MANEUVERING DEVICE FOR MOTOR VEHICLES

The present invention relates to motor vehicles, and particularly to lifting and maneuvering devices for such vehicles.

In order to facilitate parking a motor vehicle, many different types of lifting and maneuvering devices have been designed, including an auxiliary wheel assembly mounted adjacent to the rear end of the vehicle. These usually include a vertical driver for lowering the assembly to an operative position in engagement with the vehicle supporting surface, to permit the respective end of the vehicle to be maneuvered in a lateral direction with respect to its opposite end, and thereby to assist the driver in parking the vehicle in very narrow parking spaces. As far as we are aware, however, none of the previous proposed devices has yet found wide commercial use, and we believe this to be because of the complicated and expensive constructions of these previously proposed devices.

An object of the present invention is to provide for motor vehicles a new lifting and maneuvering device having a number of advantages as will be more particularly set forth below.

According to one broad aspect of the present invention, there is provided a lifting and maneuvering device for motor vehicles, including a drive motor, at least two drive wheels, and a differential transmission, characterized in that the device comprises an auxiliary wheel assembly mounted adjacent to the front and/or to the rear wheels of the vehicle, vertical drive means for raising the auxiliary wheel assembly to a retracted position adjacent to the vehicle body, or for lowering the assembly to an operative position in engagement with the vehicle supporting surface to thereby lift the front and/or rear wheels of the vehicle; and means for fixing the orientation of the auxiliary wheel assembly such that its axis is parallel to or at an oblique angle to the longitudinal axis of the vehicle, whereby propelling the vehicle by its drive motor while the assembly is in its operative position will cause the vehicle to rotate.

By thus obviating the need for a separate drive for the auxiliary wheel assembly, such assemblies can be constructed very simply and inexpensively when compared to the previously proposed devices.

According to another feature of the present invention, the auxiliary wheel assembly includes a threaded nut fixed to the vehicle frame; a vertical shaft threadedly received on the nut; a motor, constituting the vertical drive means, the latter motor including a stator; and a rotor coupled to the upper end of the shaft for rotating same while the stator is supported by the shaft for vertical movement therewith; a wheel carried at the lower end of the shaft and adapted to be moved either to its upper retracted position or to its lower operative position upon the energization of the motor; and keying means between the motor stator and the vehicle frame constraining the motor stator, upon the energization of the motor, to move only in a vertical direction with the shaft and the wheel carried thereby. This feature also enables such devices to be constructed and mounted to vehicles in a very simple and inexpensive manner.

According to a still further feature of the present invention, two auxiliary wheel assemblies may be provided, one mounted adjacent to the front wheels and one mounted adjacent to the rear wheels of the vehicle, each assembly being selectively actuated by the driver. Such an arrangement greatly enhances the capabilities of the device. Thus, such a device may be used for lifting and maneuvering the vehicle in order to enter into or exit from a narrow parking space, or to rotate the vehicle with a minimum space, e.g., to orient it in the opposite direction when there is insufficient space to make a normal "U-turn". The system, however, may also be used for lifting the vehicle in order to repair or change any of its wheels, to decrease the load from all its tires during long storage, and to aid in extracting the vehicle from mud, snow or sand.

Further features and advantages of the invention will be apparent from the description below.

The invention is herein described, by way of example only, with reference to the accompanying drawings.

Figure 4:
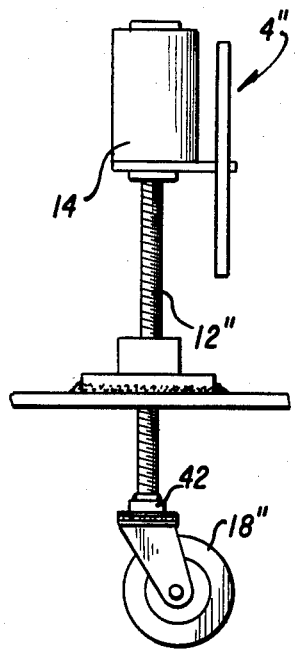
FIG. 4 illustrates another form of auxiliary wheel assembly which may be used.
Figure 7:
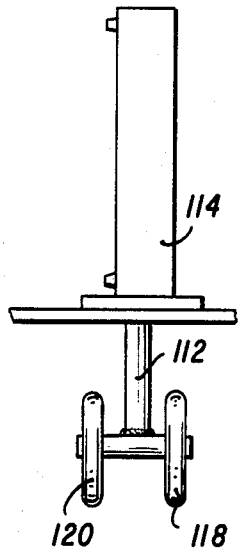
Figure 8:
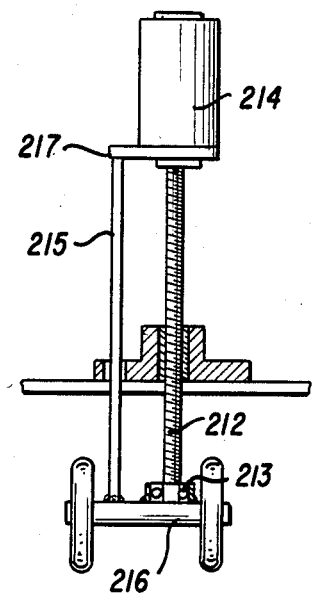
Figure 9:
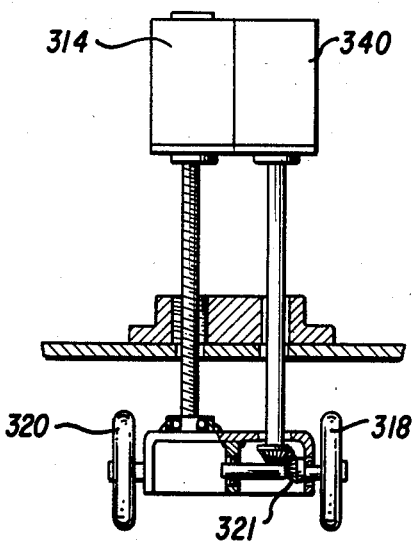
Figure 5:
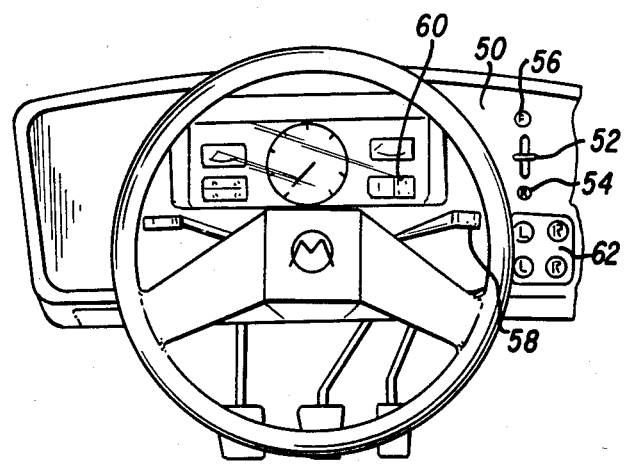
FIG. 5 illustrates the dashboard controls that may be provided when using the auxiliary wheel assembly of FIG. 4.
Figure 6A:
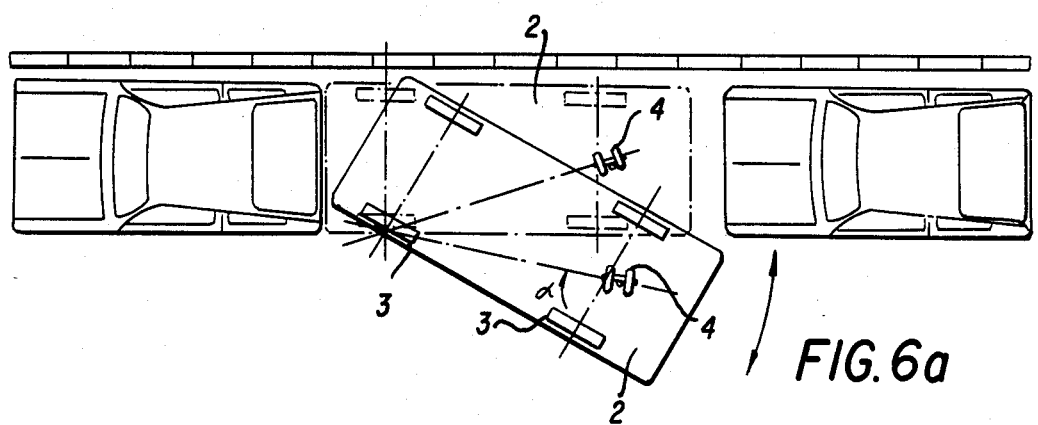
Figure 6B:
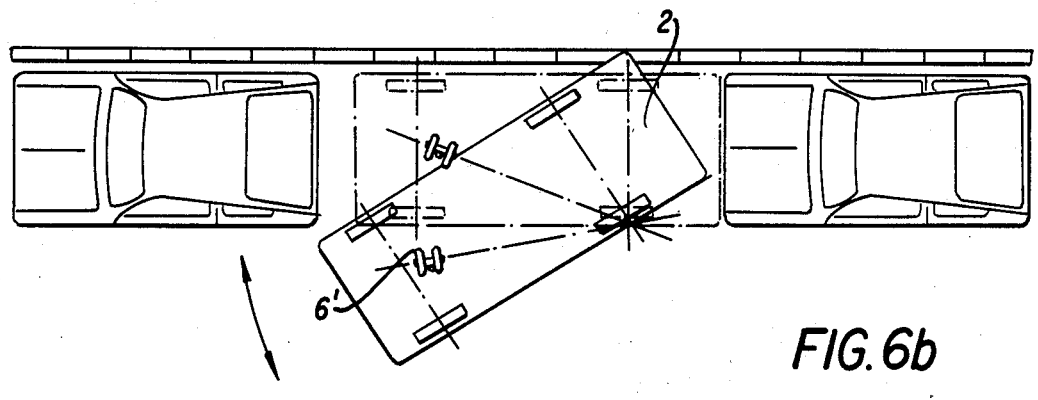
Figure 6C:
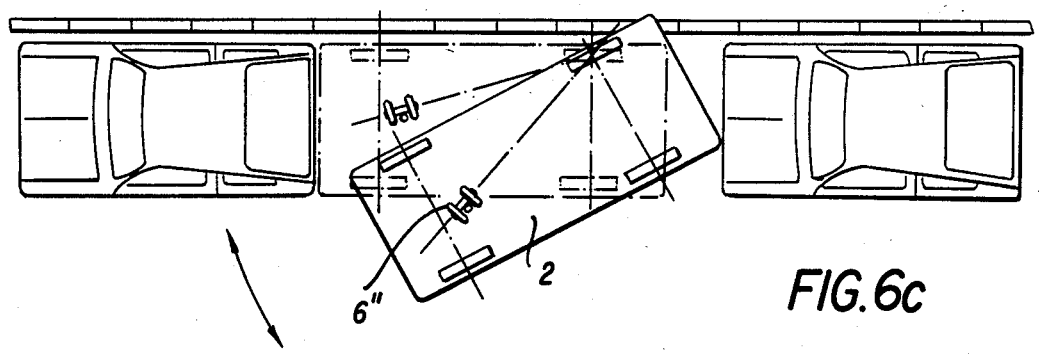

FIGS. 6a–6c diagramatically illustrate how the system illustrated in FIGS. 1–5 aids in maneuvering the vehicle into or out of tight parking spaces; and FIGS. 7, 8 and 9 illustrate further types of auxiliary wheel assemblies which may be used.

Figure 1:
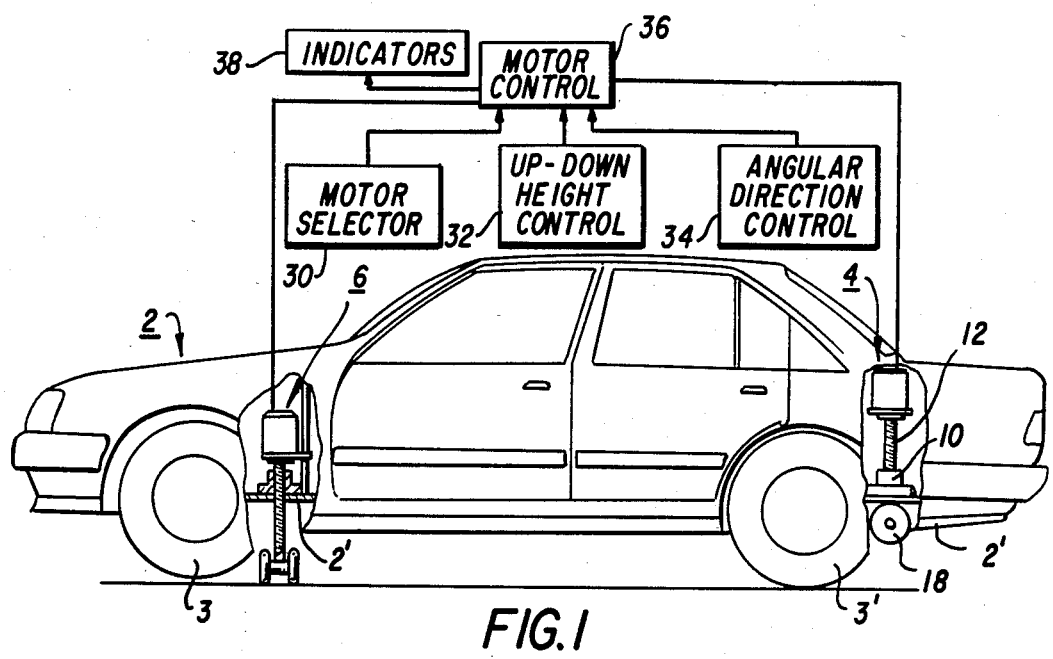
FIG. 1 is a side elevational view, partly broken-away, illustrating a vehicle equipped with one form of lifting and maneuvering device in accordance with the present invention.
Figure 2:
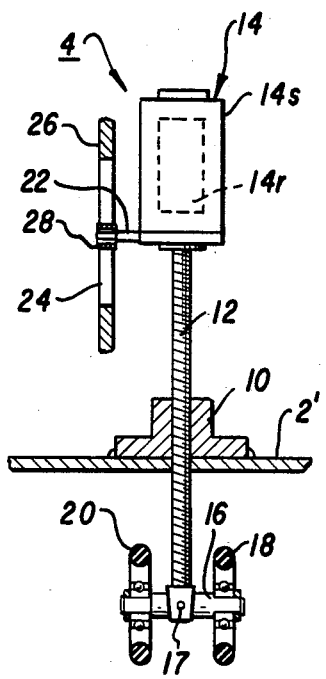
FIG. 2 is an enlarged view illustrating one of the two auxiliary wheel assemblies included in the vehicle of FIG. 1.

With reference to FIG. 1, there is illustrated a motor vehicle, generally designated 2, which may be of any of the known designs, including a drive motor, four wheels 3, at least two of which are drive wheels, and a differential transmission. In the example of the invention illustrated by FIG. 1, the vehicle is equipped with two auxiliary wheel assemblies, the rear assembly being generally designated 4, and the front assembly being generally designated 6. FIG. 2 illustrates one form of construction for the rear auxiliary wheel assembly 4, it being appreciated that the front assembly 6 may be of like construction.

Thus, as shown in FIG. 2, the vehicle frame 2', or an attachment to the frame, is provided with a threaded nut 10 at the location where the auxiliary wheel assembly 4 is to be mounted. The latter assembly includes a threaded shaft 12 received within nut 10 and an aperture formed in the vehicle frame 2', the upper end of the shaft supporting an electrical motor 14. The latter motor includes the rotor 14r coupled via a gear (not shown) to shaft 12 for rotating it, and a stator 14s movable with the rotor. Thus, as motor 14 is operated to rotate shaft 12, the shaft will move in a vertical direction within nut 10, carrying with it the motor.

The lower end of shaft 12 carries an axle 16 pivotably mounted by a pin 17 at a right angle to the axis of shaft 12, the axle rotatably supporting two wheels 18, 20 at its opposite ends. Pin 17 thus permits axle 16 to pivot should there be any slope in the ground engaged by the two wheels 18, 20 in the operative portion of the assembly.

It will thus be seen that as shaft 12 is rotated by motor 14, the shaft moves vertically within fixed nut 10, either upwardly or downwardly depending on the direction of rotation of the shaft. It will also be seen that the motor 14, supported at the upper end of the shaft, moves vertically with the shaft. To constrain the motor stator 14s to move only in the vertical direction and not to rotate, the motor stator 14s is provided with a keying pin 22 movable within a vertical slot 24 formed in member 26 fixed to the vehicle frame 2, the outer tip of pin 22 being provided with a bearing 28 to reduce friction during the movement of the pin within the slot.

As indicated earlier, the motor vehicle illustrated in FIG. 1 is provided with two such auxiliary wheel assemblies, at 4 and 6 respectively. The motor vehicle is also provided with a motor selector, shown schematically as 30 in FIG. 1, for selecting the rear or front auxiliary wheel assembly to be actuated; an up-down height control 32 for controlling the vertical position of the selected wheel assembly; and an angular direction control 34 for controlling the angular orientation of the selected wheel assembly, i.e., the orientation of its wheel axis (e.g., axle 16 in FIG. 2). These controls schematically shown by blocks 30, 32 and 34, would be located on the vehicle dashboard or control panel, for convenient access by the driver. Also schematically shown in FIG. 1 is a motor control circuit 36 which controls the motors of the two auxiliary wheel assemblies 4, 6 and also indicates the status or control effected via indicators 38. An example of the above controls is shown in FIG. 5, to be described below.

Figure 3:
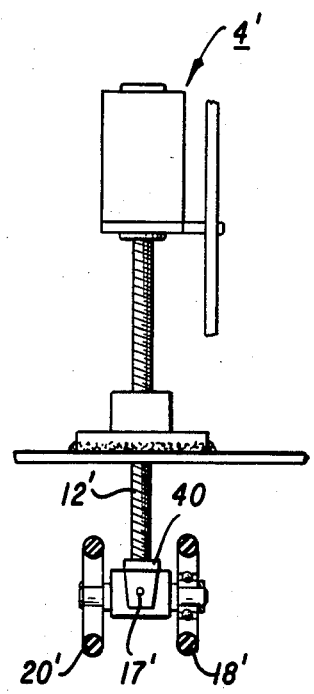
FIG. 3 illustrates another form of auxiliary wheel assembly which may be included in the vehicle of FIG. 1.

FIG. 2 illustrates the auxiliary wheel assembly of very simplified construction, including a motor (namely motor 14) only for driving the auxiliary wheels 18, 20 in the vertical direction, i.e., either to their raised retracted position adjacent to the vehicle frame as illustrated by assembly 4 in FIG. 1, or to their extended, operative position in engagement with the road pavement and lifting the respective wheels of the vehicle therefrom, as shown by assembly 6 in FIG. 1. Thus, in this simplified construction, the auxiliary wheel assembly itself does not include a separate motor for driving the auxiliary wheels 18, 20 themselves. Such a wheel drive, as will be described below particularly with reference to diagrams of FIGS. 6a-6c, is not essential and therefore assembly illustrated in FIG. 2 may be considered a "passive" one in that the power for rotating the auxiliary wheels 18, 20 is derived externally of the assembly, namely from the motion of the vehicle itself. In some cases, however, it may be desirable in order to increase the maneuverability of the vehicle, as will also be described below with respect to the diagrams of FIGS. 6a-6c, to provide one of the assemblies with a motor for driving the auxiliary wheels 18, 20. This is shown in FIG. 3, wherein the auxiliary wheel assembly, designated 4' is identical to that illustrated in FIG. 2 except that it includes an electric motor 40 pivotably mounted by pin 17' to the threaded shaft 12' for driving the auxiliary wheels 18', 20'. The electric motor may be connected to the vehicle's electric system in any suitable manner, e.g., by electrical wires passing through a bore in shaft 12' connected to slip rings. Wheel 18' is coupled to the motor stator and wheel 20' is coupled to its rotor.

On the other hand, FIG. 4 illustrates an auxiliary wheel assembly, therein designated 4" of even simpler construction than that illustrated in FIG. 2. This simplified assembly 4" includes a caster wheel 18" (or a plurality of such wheels) pivotably mounted at 42 to the bottom of the threaded shaft 12", the axis of the caster wheel 18" being eccentric to that of the shaft so that the caster wheel will tend to pivot according to the direction of movement of the shaft. When the motor vehicle is equipped with a caster-type auxiliary wheel assembly as illustrated in FIG. 4, the lifting and maneuvering device includes means for selectively braking one of the drive wheels (3 or 3' in FIG. 1) while operating the other drive wheel so that the vehicle will pivot about an axis located at the braked wheel while rolling along the caster wheel of the respective auxiliary wheel assembly.

FIG. 5 illustrates, for purposes of example, the various controls which may be included in a motor vehicle equipped with two auxiliary wheel assemblies 4, 6 shown in FIG. 1, on or adjacent to the dashboard 50 for convenient access by the driver. These controls include a selector switch 52 which may be used for selectively operating either the rear auxiliary assembly 4, or the front assembly 6, and light indicators 54, 56, respectively, to indicate the operative assembly. After the selection is made by the selector switch 52, the actual operation of the selected assembly is effected by arm 58, which is movable inwardly toward the driver to raise the selected assembly and outwardly from the driver to lower the selected assembly, and to change its angular orientation. Arm 58 is also movable up or down to rotate the vehicle in one or the opposite direction when equipped with a powered auxiliary wheel assembly as illustrated, e.g., in FIG. 3. The height and angular orientation of the selected auxiliary wheel assembly are both indicated by an indicator 60 provided on the dashboard 50. The dashboard 50 illustrated in FIG. 5 further includes a brake selector and indicator device 62, which permits the driver to selectively brake one of the drive wheels, which is indicated by unit 62, this brake selector being particularly useful when the vehicle is equipped with the caster-type auxiliary wheel assembly illustrated in FIG. 4.

Reference is now made to FIGS. 6a-6c which illustrate, for purposes of example, some of the maneuvers that may be made by a vehicle equipped with the above-described lifting and maneuvering device. Briefly, these devices enable two wheels of the vehicle, or all the wheels of the vehicle, to be lifted off the road pavement; they also enable the vehicle to be rotated about an axis selected by the driver, for example, to enter or leave tight parking spaces or to change the vehicle direction of travel in a very limited space.

Thus, FIG. 6a illustrates the manner of using the lifting and maneuvering device for entering (or leaving) a very narrow parking space. Here, the vehicle enters the parking space by driving its front end into the space, as shown in FIG. 6a, whereupon the rear auxiliary wheel assembly 4 is lowered to its operative position to raise the rear wheels of the vehicle off the pavement. This assembly is oriented so that its axle (16, FIG. 2) forms an oblique angle ($\alpha$), less than 90° to the axle through the vehicle wheels 3. In this case, the two front vehicle wheels are the drive wheels. Thus, when this angle $\alpha$ is oblique (less than 90°), the forward movement of the vehicle by its drive wheels 3 will cause the vehicle to rotate such as to produce a large lateral movement of the rear end for a short forward movement of the front end, thereby enabling the vehicle to enter the tight parking space in FIG. 6a. It will also be seen from FIG. 6a that the front drive wheel on the curb side of the vehicle will move a much greater distance than the front drive wheel on the street side of the vehicle, this greater movement being permitted by differential transmission commonly provided in motor vehicles to permit turning. It will also be appreciated that the operator can preselect the angle α according to the size of the parking space available for parking his vehicle. In general, a tighter parking space requires an increase in this angle.

So long as angle α is less than 90° and the drive wheels contact the road, no separate drive for driving the auxiliary wheels is necessary; therefore the auxiliary wheel assembly may be of the passive type illustrated in FIG. 2 (also in FIGS. 7 and 8 described below). However, if it is desired to permit the vehicle to be maneuvered as described above even when this angle (α) is 90°, then it would be necessary to have a drive for the auxiliary wheels, and therefore the assembly should be of the active type, e.g., as illustrated in FIG. 3 (or in FIG. 9, described below).

FIG. 6b illustrates the maneuvering of the rear end of the vehicle when equipped with an active auxiliary wheel assembly adjacent to the front end of the vehicle for parking or exiting from a very tight parking space. In FIG. 6b, the vehicle front wheels 3 are the drive wheels, and therefore the auxiliary wheel assembly 6' used in this case is of the active type, including its own drive motor 40 as illustrated in FIG. 3.

FIG. 6c illustrates a vehicle including rear drive wheels with a swiveling caster-type auxiliary wheel assembly, shown as 6", mounted adjacent to the front end of the vehicle. Such a caster-type assembly may be as illustrated in FIG. 4, and may include the controls, particularly the individual-wheel braking control, described above with respect to FIG. 5 and illustrated by the brakeselector 62 of FIG. 5. Thus, when such a caster-type auxiliary wheel assembly is used, one of the drive wheels is braked (this being the curb-side rear drive wheel in FIG. 6c), thereby permitting the vehicle to rotate about a vertical axis located at the curb-side rear-drive wheel.

It will be appreciated that the vehicle could be equipped with only one of the two auxiliary wheel assemblies (4 or 6) illustrated in FIG. 1, which will somewhat decrease the maneuverability of the vehicle and also affect other possible applications of the auxiliary wheel assembly, e.g., relieving the vehicle weight from all four tires during long storage. Many other variations and modifications may be included, some of which are illustrated in FIGS. 7-9.

Thus, as shown in FIG. 7 the vertical drive for the auxiliary wheel assembly is an hydraulic or pneumatic motor, shown at 114, rather than an electrical motor as in the above-described embodiments. In FIG. 7 the auxiliary wheels 118 and 120 are supported by a piston stem 112 projecting through the housing of the hydraulic or pneumatic unit 114, and therefore these auxiliary wheels can be raised and lowered but cannot be oriented in a selected direction. The direction is determined at the time of installation.

FIG. 8 illustrates a passive, non-adjustable arrangement wherein the keying means for constraining the movement of the motor stator 214 to a vertical path is constituted of a rod 215 secured to shaft 216 carried by a rotary joint 213 at the bottom of the threaded shaft 212, keyed to a plate 217 fixed to motor stator 214.

FIG. 9 illustrates a still further non-adjustable arrangement wherein one motor 314 is provided for raising and lowering auxiliary wheels 318, 320, and a second motor 340 fixed to motor 314, is provided for driving the auxiliary wheels. The drive motor 340 is coupled to the auxiliary wheels 318 via a gear transmission 321.

Still many other variations, modifications, and applications of the invention may be made.

What is claimed is:

1. A lifting and maneuvering device for a motor vehicle having a motor vehicle frame, a vehicle motor for propelling the motor vehicle, a differential transmission, and two sets of vehicle wheels each mounted on an axle for supporting the motor vehicle on a vehicle supporting surface, comprising: a secondary wheel assembly mounted to the motor vehcile frame in proximity to one of the axles of the motor vehicle, the secondary wheel assembly including a maneuvering wheel and vertical drive means for moving the second wheel assembly back and forth between an upper retracted position and a lower operative position, in the operative position the maneuvering wheel comes in contact with the vehicle supporting surface and lifts one set of vehicle sheels off the vehicle support surface, the secondary wheel assembly further including a threaded nut fixed to the motor vehicle frame, a vertical shaft threadedly recieved on the nut and capable of support of the motor vehicle, the vertical drive means comprising a secondary motor having a stator and a rotor, the rotor coupled to the upper end of the shaft for rotating the shaft while the secondary motor is supported by the shaft for vertical movement thereon, the shaft being moved in a vertical direction by the secondary motor simultaneously with the vertical movement of the secondary motor, the secondary wheel assembly further including wheel means which include the maneuvering wheel and secondary axle means, the maneuvering wheel rotatably attached to the secondary axle means as part of the wheel means and having an axis of rotation generally prependicular to the shaft, the wheel means being fixedly mounted on the lower end of the shaft whereby rotational motion of the shaft causes the wheel means to rotate simultaneously with the shaft thereby rotating the axis of the maneuvering wheel with the rotational motion of the shaft, the secondary wheel assembly capable of reciporcal movement between the upper retracted position and the lower operative position upon the energization of the secondary motor, wherein when the secondary wheel assembly is in the operative position operation of the vehicle motor causes the motor vehicle to rotate.

2. The lifting and maneuvering device of claim 1 wherein the secondary motor has an outer casing connected to the stator, and further comprising keying means between the outer casing of the secondary motor and the motor vehicle frame for constraining the outer casing and the stator of the secondary motor only to movement in a generally vertical direction as the secondary wheel assembly moves back and forth between the operative and retracted positions.

3. The lifting and maneuvering device of claim 2 wherein the keying means comprises a pin connected to the outer casing of the secondary motor, and the keying means further comprising slot means connected to the motor vehicle frame for defining an elongated vertical slot within which the pin rides as the secondary wheel assembly moves back and forth between the retracted position and the operative position.

4. The lifting and maneuvering device of claim 3 wherein the pin has a bearing surface which contacts the slot means as the secondary wheel assembly move back and forth between the retracted position and the operative position, to reduce friction.

5. The lifting and maneuvering device of claim 2 wherein the secondary wheel assembly is mounted in proximity to the center of one of the axles of the motor vehicle.

6. The lifting and maneuvering device of claim 5 wherein the wheel means comprises two maneuvering wheels mounted along a commond axis.

7. The lifting and maneuvering device of claim 2 wherein the secondary wheel assembly further comprises means for controllably rotating the maneuvering wheel so that when the secondary control means is in the operative position the maneuvering wheel can be controllably rotated to propel the vehicle along the vehicle support surface.

8. The lifting and maneuvering device of claim 2 wherein the secondary axle means is pivotably mounted to the shaft to allow limited pivotable movement of the secondary axle means about a horizontal axis for conforming the secondary axle means to a ground slope of the vehicle support surface.

9. The lifting and maneuvering device of claim 2 further comprising two secondary wheel assemblies, one secondary wheel assembly mounted to the motor vehicle frame in proximity to one of the axles of the motor vehicle, and the other secondary wheel assembly mounted to the motor vehicle frame in proximity to the other axle of the motor vehicle.

10. The lifting and maneuvering device of claim 1 further comprising angular direction control means operatively connected to the secondary motor to allow an operator of the motor vehicle to selectively control the angular position of the shaft simultaneously with the axis of the maneuvering wheel.

11. The lifting and maneuvering device of claim 10 wherein the secondary wheel assembly is mounted in proximity to the center of one of the axles of the motor vehicle.

12. The lifting and maneuvering device of claim 11 wherein the wheel means comprises two maneuvering wheels mounted along a common axis.

13. The lifting and maneuvering device of claim 10 wherein the secondary wheel assembly further comprises means for controllably rotating the maneuvering wheel so that when the secondary control means is in the operative position the maneuvering wheel can be controllably rotated to propel the vehicle along the vehicle support surface.

14. The lifting and maneuvering device of claim 10 wherein the secondary axle means is pivotably mounted to the shaft to allow limited pivotable movement of the secondary axle means about a horizontal axes for conforming the secondary axle means to a ground slope of the vehicle support surface.

15. The lifting and maneuvering device of claim 10 further comprising two secondary wheel assemblies, one secondary wheel assembly mounted to the motor vehicle frame in proximity to one of the axles of the motor vehicle, and the other secondary wheel assembly mounted to the motor vehicle frame in proximity to the other axle of the motor vehicle.

16. The lifting and maneuvering device of claim 1 wherein the secondary wheel assembly is mounted in proximity to the center of one of the axles of the motor vehicle.

17. The lifting and maneuvering device of claim 16 wherein the wheel means includes two maneuvering wheels mounted along a common axis.

18. The lifting and maneuvering device of claim 1 wherein the secondary wheel assembly further comprises means for controllably rotating the maneuvering wheel so that when the secondary control means is in the operative position the maneuvering wheel can be controllably rotated to propel the vehicle along the vehicle support surface.

19. The lifting and maneuvering device of claim 1 wherein the secondary axle means is pivotably mounted to the shaft to allow limited pivotable movement of the secondary axle means about a horizontal axis for conforming the secondary axle means to a ground slope of the vehicle support surface.

20. The lifting and maneuvering device of claim 1 further comprising two secondary wheel assemblies, one secondary wheel assembly mounted to the motor vehicle frame in proximity to one of the axles of the motor vehicle, and the other secondary wheel assembly mounted to the motor vehicle frame in proximity to the other axle of the motor vehicle.

* * * * *